United States Patent [19]

Brooks

[11] Patent Number: 5,017,322
[45] Date of Patent: May 21, 1991

[54] PROCESS FOR INHIBITING FOULING OF AN UNDERWATER SURFACE

[75] Inventor: Rodney R. Brooks, Gateshead, England

[73] Assignee: International Paint public limited company, United Kingdom

[21] Appl. No.: 311,167

[22] Filed: Feb. 14, 1989

[30] Foreign Application Priority Data

Feb. 15, 1988 [GB] United Kingdom ............... 8803458

[51] Int. Cl.$^5$ ..................... B29C 41/22; B32B 27/26
[52] U.S. Cl. .................... 264/255; 114/357; 264/DIG. 57; 427/385.5; 427/387; 428/423.1; 428/447
[58] Field of Search ....... 114/357; 264/255, DIG. 57; 427/385.5, 387; 428/423.1, 447

[56] References Cited

U.S. PATENT DOCUMENTS

| | | | |
|---|---|---|---|
| 3,702,778 | 11/1972 | Mueller et al. | 156/329 |
| 4,099,280 | 7/1978 | Hoppe et al. | 114/357 |
| 4,302,553 | 11/1981 | Frisch et al. | 525/28 |
| 4,500,688 | 2/1985 | Arkles | 525/431 |

FOREIGN PATENT DOCUMENTS

| | | |
|---|---|---|
| 0016195 | 12/1982 | European Pat. Off. |
| 0089071 | 9/1983 | European Pat. Off. |
| 0032597 | 11/1983 | European Pat. Off. |
| 5073729 | 11/1978 | Japan . |
| 57-172917 | 10/1982 | Japan . |
| 262385S | 10/1970 | U.S.S.R. |
| 1307001 | 2/1973 | United Kingdom . |
| 1470465 | 4/1977 | United Kingdom . |
| 1477055 | 6/1977 | United Kingdom . |
| 1581727 | 12/1980 | United Kingdom . |
| 2141436 | 12/1984 | United Kingdom . |

OTHER PUBLICATIONS

J. R. Ebdon, D. J. Hourston and P. G. Klein; Chapter 11, "Advances in Chemistry Series No. 211-Multi Component Polymer Materials", pp. 173-193.
J. R. Ebdon, D. J. Hourston and P. G. Klein; "Polymer" 1984, vol. 25, pp. 1633-1639.
J. R. Ebdon, D. J. Hourston and P. G. Klein; "Polymer" 1986, vol. 27, pp. 1807-1814.

*Primary Examiner*—James Lowe
*Attorney, Agent, or Firm*—Eckert Seamans Cherin & Mellott

[57] ABSTRACT

A process of applying a coating composition to an underwater surface to inhibit fouling by marine organisms which includes
(A) a curable polyorganosiloxane,
(B) a curing agent capable of curing the polyorganosiloxane (A) to a silicone elastomer,
(C) a polyisocyanate, and
(D) either
(D.1) a compound having more than one active hydrogen group capable of reacting with the polyisocyanate (C) to form a polyurethane, polyurea or poly(urethane-urea) or
(D.2) a compound hydrolysable to (D.1).

25 Claims, No Drawings

PROCESS FOR INHIBITING FOULING OF AN UNDERWATER SURFACE

FIELD OF THE INVENTION

This invention relates to the inhibition of fouling of an underwater surface by marine organisms such as algae and barnacles. By an underwater surface we mean a surface which is intended to be underwater at least some of the time in use. Examples of underwater surfaces are ships' hulls, the underwater and splash zone surfaces of oil production platforms and cooling water inlets and outlets for power stations.

BACKGROUND OF THE INVENTION

Silicone rubber, fouling-resistant compositions are described for example in UK Patents 1307001, 1470465 and 1581727, UK Patent Application 2141436, European Patent 16195 and U.S. Pat. No. 3,702,778. They have significant advantages over conventional anti-fouling compositions containing marine biocides which are gradually leached from the paint. The silicone rubber coatings rely on their low surface energy, rather than on biocides, to inhibit settlement of marine organisms. There has been some concern about the release of triorganotin biocides, one of the most effective and widely used types of marine biocide, from paint on the hulls of yachts and pleasure boats. Moreover, conventional anti-fouling paints eventually become ineffective as all their biocide is released. Silicone rubber coatings are potentially capable of retaining their low energy surface indefinitely.

There are, however, practical difficulties in the use of silicone rubber, fouling-resistant compositions, especially as coatings for ships' hulls. They are mechanically rather weak; in particular they have low tear strength and low cohesive strength so that the paint film is easily damaged.

European Patent 32597 describes an anti-fouling coating comprising a vulcanised silicone rubber, which rubber contains grafted silicon-free segments which are constituted of recurrent units of ethylenically unsaturated monomers such as butyl acrylate or styrene. This coating is described as having a high cohesive strength, but in practice has been found to give reduced anti-fouling properties.

European Patent Application 89071 describes a similar silicone rubber containing grafted silicon-free segments which are preferably derived from polymerisation of ethylenically unsaturated monomers. It mentions that the silicon-free segments can be derived from urethane-based units. Polyurethane segments can be attached to silicon atoms of the silicone rubber by means of an oxyphenylene group or an amino-phenylene group.

British Patent 1477055 describes an anti-icing coating of a polyurethane prepared from an isocyanate functional material and a polycarbinol silicone.

SUMMARY OF THE INVENTION

A process according to the present invention for inhibiting fouling of an underwater surface comprises applying to the surface a coating composition comprising
(A) a curable polyorganosiloxane,
(B) a curing agent capable of curing the polyorganosiloxane (A) to a silicone elastomer,
(C) a polyisocyanate, and
(D) either
  (D.1) a compound having more than one active hydrogen group capable of reacting with the polyisocyanate (C) to form a polyurethane, polyurea or poly(urethane-urea) or
  (D.2) a compound hydrolysable to (D.1).

DETAILED DESCRIPTION OF THE INVENTION

The curing agent (B) is preferably a material capable of reacting with the polyorganosiloxane (A) at ambient temperature to cure the polyorganosiloxane, and the compound (D.1) is preferably a compound capable of reacting with the polyisocyanate (C) at ambient temperature to form a polyurethane, polyurea or poly(urethane-urea). If a compound (D.2) hydrolysable to an active hydrogen compound (D.1) is used, it is preferably a compound hydrolysable by atmospheric moisture at ambient temperature.

The polyorganosiloxane (A) and its curing agent (B) are preferably packaged separately from each other. Similarly, the polyisocyanate (C) and the active-hydrogen-providing compound (D) are preferably packaged separately from each other. It is preferred that the polyorganosiloxane reacts primarily with its own curing agent and not to any substantial extent with the polyisocyanate or the active hydrogen compound. Similarly, the curing agent for the polyorganosiloxane should react primarily with the polyorganosiloxane rather than with the polyisocyanate or the active hydrogen compound. The polyisocyanate and the active hydrogen compound should each react more readily with each other than with either the polyorganosiloxane or the curing agent for the polyorganosiloxane. The polyorganosiloxane curing reaction and the polyurethane-forming reaction preferably have similar reaction rates. In this case the cured polyorganosiloxane and the polyurethane, polyurea or poly(urethane-urea) may be at least partially in the form of an interpenetrating polymer network.

The proportion of polyorganosiloxane elastomer to polyurethane, polyurea and/or poly(urethane-urea) in the cured coating, and thus the ratio of the polyorganosiloxane (A) plus curing agent (B) to the polyisocyanate (C) plus active-hydrogen-providing compound (D) in the coating composition, is generally 60:40 to 95:5 by weight, most preferably 70:30 to 90:10 by weight. The cured product is generally not a uniform interpenetrating polymer network but consists of domains of polyurethane, polyurea or poly(urethane-urea) within a network of crosslinked polyorganosiloxane, with interpenetration of the two polymer networks at the boundary of each polyurethane domain.

Thus according to another aspect of the invention an underwater surface has as its outermost covering layer a cured polymer composition consisting of domains of a polyurethane, polyurea or poly(urethane-urea) within a network of a crosslinked polyorganosiloxane elastomer, with interpenetration of the two polymer networks at the boundaries of the polyurethane, polyurea or poly(urethane-urea) domains.

the cured product has improved mechanical properties due to the reinforcing effect of the polyurethane, polyurea or poly(urethane-urea) while retaining the low surface energy of the polyorganosiloxane elastomer which provides the anti-fouling effect. If the proportion of polyurethane or polyurea or poly(urethane-urea) in the composition is increased above about 40 per cent by weight there is a risk that the opposite type of phase structure will occur, that is silicone rubber domains within a polyurethane continuous phase. This will not give a sufficiently low surface energy to prevent marine fouling.

Formation of polyurethane polysiloxane interpenetrating polymer networks is described by J.R. Ebdon, D.J. Hourston, and P.G. Klein in Chapter II of "Advances in Chemistry Series No. 211—Multicomponent Polymer Materials" edited by D.R. Paul and L.H. Sperling and published in 1986 by the American Chemical Society. There is no mention of the use of polyurethane polysiloxane interpenetrating polymer networks in coating or to achieve protection against marine fouling.

The polyorganosiloxane elastomer is preferably based on a polydiorganosiloxane having hydroxyl end groups, which can be cured at ambient temperature by an alkoxysilane, such as for example tetraethyl orthosilicate. Alternative but less preferred curing agents are tetraalklyl titanates and aluminium alcoholates. The polydiorganosiloxane can for example by a polydimethylsiloxane, which is preferred, or a methyl phenyl polysiloxane. Examples of polyorganosiloxanes suitable for use as (A) are those sold by Rhone Poulenc under the Trade Mark "Rhodorsil 48V", for example "Rhodorsil 48V 3500", and those used by Dow Corning the silicone rubber composition "RTV 3110" and I.C.I. in "Silicoset 105". The optimum amount of curing agent (B) used is an amount sufficient to cure the polyorganosiloxane (A) effectively. Appropriate amounts can be determined by preliminary experimentation. Figures which may be mentioned are ratios (A):(B) of 100:1 to 5:1, by weight. The coating composition preferably contains a catalyst for the polyorganosiloxane curing reaction, for example an organic tin compound such as dibutyltin dilaurate, stannous octoate or dibutyl tin diacetate. Such an organic tin catalyst is preferably used at 0.1 to 1.0 per cent by weight of the coating composition.

The polyorganosiloxane (A) can alternatively be a moisture-curable silicone rubber since atmospheric moisture is generally present when coating marine surfaces. Such a moisture-curable polyorganosiloxane can have hydrolysable end groups, for example the reaction product of a hydroxyl-tipped polydiorganosiloxane with a compound containing at least two hydrolysable groups, for example an acetoxy compound such as methyl triacetoxy silane. In the case of moisture-curable silicone rubbers the polydiorganosiloxane and its curing agent, for example tetraethyl orthosilicate, can be packaged together provided that they are protected from moisture.

Alternative ambient-temperature-curing polyorganosiloxane elastomers are polymers containing silanol groups which can be cured by polymers containing silicon hydride groups in a metal-salt-catalysed reaction, or vinyl-containing silicones which are cured by silicon hydride compounds using a platinum complex as catalyst.

The polyisocyanate is preferably a diisocyanate. It preferably includes a polymer chain and can for example be an isocyanate-tipped polyether or a polyether-urethane prepolymer. The polyether can for example be a polyethylene glycol, polypropylene glycol or polytetramethylene ether glycol and can be tipped with a diisocyanate such as toluene diisocyanate, methylene bis(-para-phenyl isocyanate) or preferably a cycloaliphatic diisocyanate, for example isophorone diisocyanate or bis(4-isocyanato-cyclohexyl) methane. The hydroxyl-tipped polyether can be reacted with the diisocyanate in a proportion of isocyanate groups to hydroxyl groups of above 2:1 to produce primarily an isocyanate-tipped polyether or at a ratio of isocyanate groups to hydroxyl groups of below 2:1 to produce primarily an isocyanate-tipped polyether-urethane prepolymer. The polyisocyanate formed preferably has a molecular weight in the range 600–3000. One particularly preferred polyisocyanate comprises a polytetramethylene ether glycol of molecular weight 100 to 3000 tipped with a cycloaliphatic diisocyanate such as bis(4-isocyanato-cyclohexyl) methane or isophorone diisocyanate.

The compound (D.1) having more than one active hydrogen group used to react with the polyisocyanate is generally a compound containing at least two groups selected from hydroxyl and amine groups. The preferred active hydrogen compound used with an isocyanate-tipped polymer as described above is a low molecular weight compound (of molecular weight less than 600, preferably less than 300). The compound (D.1) can for example be a cyclic compound, most preferably an aromatic compound such as an aromatic diamine. Examples of such compounds are 2,4-ethyl-6-methyl-benzene-1,3-diamine and methylene dianiline and chlorinated derivatives thereof such as bis(3-chloro-4-aminophenyl) methane.

Compounds having two active hydrogen groups (amine or hydroxyl groups) are preferably used as at least the major component providing active hydrogen groups. An alternative acyclic polyhydroxyl compound which can be used is trimethylolpropane, although this has a slower rate of reaction than the amines mentioned above and is preferably not used as the only active hydrogen compound. Polyamines or hydroxy-amines, or compounds hydrolysable thereto, are generally preferred as the active hydrogen compound (D). They react with the polyisocyanate to form respectively polyureas or poly(urethane-ureas).

The active-hydrogen-providing compound (D) is preferably used in an amount sufficient to provide 0.5 to 2 active hydrogen groups per isocyanate group in the polyisocyanate (C).

An example of a compound (D.2) hydrolysable by atmospheric moisture to provide a compound (D.1) having active hydrogen groups is an oxazolidine, which is capable of hydrolysis to a beta-hydroxy amine. The oxazolidine compound preferably contains at least two oxazolidine groups particularly a bis(oxazolidine), for example of the formula

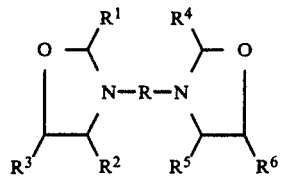

where R is a divalent organic group and $R^1$ to $R^6$ are each independently hydrogen or an inert substituent, for example an alkyl group having 1 to 8 carbon atoms. The divalent organic group R can be an alkylene or arylene group, e.g. of up to 15 carbon atoms, or may consist of two or more alkylene and/or arylene groups e.g. of up to 15 carbon atoms, joined by one or more ether (O), ester (OCO), amide (CONH) or urethane (OCONH) linkages. Examples of suitable oxazolidines are

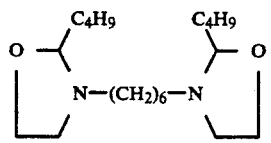

and

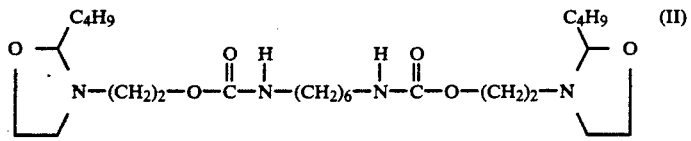

the coating composition may contain an acid catalyst, preferably a carboxylic acid, for the hydrolysis of the oxazolidine, for example a long-chain carboxylic acid having at least 10 carbon atoms such as stearic acid or oleic acid, or salicylic acid or a lower molecular weight carboxylic acid such as heptanoic acid, which gives advantages of easier control of the rate of the urethane-forming or urea-forming reaction and is less subject to yellowing or aging than coatings prepared using an aromatic amine.

The polyurethane, polyurea or poly(urethane-urea) formed in the cured coating is preferably elastomeric. In general, this requires the presence of flexible polymer chains bonded at intervals by low molecular weight crosslinking groups, so that one component of the polyurethane-forming ingredients is a flexible polymer chain having reactive end groups and the other component is a low molecular weight crosslinking component. In one alternative the polyisocyanate may comprise a flexible polymer chain tipped with isocyanate groups, as described above, and the active hydrogen compound may be a low molecular weight compound as described above. Alternatively, the polyisocyanate can be a low molecular weight compound of average molecular weight less than 300, for example toluene diisocyanate or methylene bis(para-phenyl isocyanate) or a mixture thereof with a more highly functional isocyanate such as polymethylene poly(phenyl isocyanate). The active hydrogen compound used with such a low molecular weight polyisocyanate can be a flexible polymer chain tipped with hydroxyl and/or amine groups, for example a hydroxyl-tipped polyether or aliphatic polyester, of molecular weight 600 to 3000.

The coating composition of the invention preferably also includes a non-reactive fluid polyorganosiloxane or organic compound. A fluid polydiorganosiloxane, for example a silicone oil as described in British Patent 1470465, is preferred. The silicone oil preferably has a viscosity of 20 to 1000 mPa s. The silicone oil can be a polydimethyl siloxane but is most preferably an alkyl aryl polydiorganosiloxane, for example a methyl phenyl silicone oil, to give the best anti-fouling effect. Examples of such silicone oils are sold by Rhone Poulenc as "Rhodorsil Huile 550" and by Down Corning as "DC550". Examples of organic fluids which can be used are lubricating mineral oils such as white oil, low molecular weight polybutene, petrolatum and liquid paraffin/petrolatum mixtures. The non-reactive fluid compound can be enclosed in either component of a two-package coating composition.

Especially when the preferred hydroxyl-tipped polydiorganosiloxanes are used, the coating composition can conveniently be stored as a two-pack composition. The hydroxyl-tipped polydiorganosiloxane or other polyorganosiloxane (A) can be packaged with the active-hydrogen-providing compound (D) and the polyisocyanate (C) can be packaged with the alkoxysilane or other curing agent (B), for example tetraethyl orthosilicate. Any catalyst for the curing of the polyorganosiloxane, for example an organic tin compound such as dibutyl tin dilaurate, can be included in either package, although for optimum storage stability it is preferably kept separate from the polyisocyanate unless a stabilised catalyst composition is used; for example as sold under the trade name "Rhodorsil 60R". The two packages are mixed shortly before application of the coating composition to the substrate. They can be mixed in a container and then applied by spray, roller or brush or can be mixed during application in twin feed spray, for example a twin feed airless spray.

The coatings of the invention have several advantages over known fouling-resistant coatings based on silicone rubbers. Surprisingly, the coatings of the invention show improved resistance to fouling. The cured coatings of the invention containing no silicone oil or organic fluid show decreased fouling by marine organisms compared to cured silicone elastomers alone, and the adhesion of any fouling organisms to the surface is also decreased. Similarly, cured coatings of the invention containing a non-reactive fluid polyorganosiloxane such as a methyl phenyl silicone oil show decreased fouling and decreased adhesion of fouling organisms compared to known silicone elastomer compositions containing silicone oils such as those described in British Patent 1470465. The movement of a ship through sea-water in service can provide a water flow sufficient to ensure that fouling organisms do not adhere to the coating.

The cured coating has increased tear strength compared to pure silicone rubber coatings. Coatings containing 10-30 per cent by weight polyurethane or polyurea, for example, can show a doubling or trebling of the tear strength. The adhesion of the coating to the substrate may also be improved.

The polymer network of polyorganosiloxane elastomer and polyurethane, polyurea or poly(urethane-urea) is preferably applied to the underwater surface by direct application of a curable coating composition as described above. The underwater surface can be pretreated with a tie coat having good adhesion to silicone rubber. Such a tie coat can be based on a silicone resin containing an adhesion promoter such as an aminosilane, for example that sold under the Trade Mark "Intersleek Tie-coat".

The coating compositions of the invention are preferably unpigmented or only lightly pigmented, for example with up to 5 per cent by weight pigment. The tie coat is preferably pigmented, in particular with white or colouring pigments to give the desired colour for the ship's hull or other underwater surface. The coating compositions of the invention can contain a reinforcing pigment such as silica, particularly a hydrophobic pyrogenic silica.

The polymer network can alternatively be cast as a film or coated on a flexible reinforcing backing and secured to the marine surface as described in European Patent 16195. The polymer network can be incorporated in a newly built boat hull or part thereof as its outermost layer by the process of U.S. patent application Ser. No. 290,989 now U.S. Pat. No. 4,947,785. In this process the coating composition is applied to a mould for the production of a boat hull or part thereof and layers of curable resin are applied to the coated mould and cured in the mould.

The invention is illustrated by the following Examples:

EXAMPLE 1

A curable polydiorganosiloxane was blended with a hydrolysable oxazolidine, a silicone fluid, solvent and a hydrophobic silica structuring agent to form a base component. An isocyanate-functional prepolymer, tetraethyl orthosilicate, an organotin curing catalyst and solvent were mixed to form a curing component. The formulations of the base and curing components are set out below.

|  | percent by weight |
| --- | --- |
| Base component | |
| Alpha,omega-dihydroxy polydimethylsiloxane | 48.8 |
| Methyl Phenyl Polysiloxane fluid | 2.5 |
| Xylene solvent | 21.3 |
| Pyrogenic silica | 2.2 |
| Bis - oxazolidine of formula (II) | 1.5 |
|  | 76.3 |
| Curing component | |
| Tetraethyl orthosilicate (sold together by Rhone poulenc as "Rhodorsil 60R") | 1.66 |
| Dibutyl tin dilaurate | 0.34 |
| Xylene | 10.5 |
| Isocyanate prepolymer (isophorone diisocyanate-tipped polyether) | 11.2 |
|  | 23.7 |

The base component and curing component were combined in the proportions shown above and were applied to panels coated with "Intersleek Tie Coat" and allowed to cure. Fouling trials were carried out in which the panels were suspended from a raft in sea water at Singapore. After 9 months the panels were remarkably free from fouling. They showed even less fouling than a silicone elastomer silicone oil coating omitting the isocyanate prepolymer and bisoxazolidine. Any fouling on the coating, including algal slime as well as barnacles or weed, could easily be removed by gentle hand movement or by hosing with water. The tear strength of the coating was more than doubled compared to the silicone elastomer silicone oil coating omitting the isocyanate prepolymer and bis-oxazolidine.

EXAMPLES 2 AND 3

Following the procedure of Example 1, the following coating compositions were prepared and applied to panels:

|  | percent by weight in Example 2 | percent by weight in Example 3 |
| --- | --- | --- |
| Base component | | |
| Alpha,omega-dihydroxypoly-dimethylsiloxane | 59.6 | 59.6 |
| Methyl Phenyl polysiloxane fluid | 2.9 | 2.9 |
| Xylene | 12.0 | 11.6 |
| Pyrogenic silica | 1.7 | 1.7 |
| 2,4-Ethyl-6-methyl-benzene-1,3-diamine | 1.3 | — |
| Bis-oxazolidine of formula (II) | — | 2.2 |
|  | 77.5 | 78.0 |
| Curing agent | | |
| Tetraethyl orthosilicate | 2.0 | 2.0 |
| Dibutyl tin dilaurate (as in Example 1) | 0.4 | 0.4 |
| Xylene | 9.0 | 8.5 |
| Isocyanate Prepolymer [bis(4-isocyanato-cyclohexyl)methane-tipped Polyether] | 11.1 | 11.1 |
|  | 22.5 | 22.0 |

The cured coatings of Examples 2 and 3 showed similar fouling resistance and mechanical properties to the coatings of Example 1.

What is claimed is:

1. A process for inhibiting fouling on an underwater surface comprising applying to the surface of a mold for the production of a boat hull or part thereof a coating composition comprising:
   (a) a curable polyorganosiloxane,
   (b) a curing agent capable of curing the polyorganosiloxane (A) to a silicone elastomer,
   (c) a polyisocyanate, and
   (d) a compound having more than one active hydrogen group or hydrolyzable to a compound having more than one active hydrogen group, said active hydrogen group being capable of reacting with the polyisocyanate (C) to form a polyurethane, polyurea or poly (urethane-urea),
   into which mold are applied layers of curable resin which are cured in the mold to form a boat hull or part thereof having the coating composition as its outermost layer.

2. A process according to claim 1, in which the weight ratio of the polyorganosiloxane (A) plus curing agent (B) to the polyisocyanate (C) plus active-hydrogen-providing compound (D) in the coating composition is 60:40 to 95:5.

3. A process according to claim 2, in which said weight ratio of 70:30 to 90:10.

4. A process according to claim 1, in which the coating composition also contains a non-reactive fluid polyorganosiloxane.

5. A process according to claim 4, in which said non-reactive fluid polyorganosiloxane is methyl phenyl silicone oil.

6. A process according to claim 1, in which said coating composition also contains a non-reactive fluid organic compound.

7. A process for inhibiting fouling on an underwater surface comprising applying to the surface a coating composition comprising:

(A) a curable polyorganosiloxane, (B) a curing agent capable of curing the polyorganosiloxane (A) to a silicone elastomer, (C) a polyisocyanate, and (D) a compound having more than one active hydrogen group or hydrolyzable to a compound having more than one active hydrogen group, said active hydrogen group being capable of reacting with the polyisocyanate (C) to form a polyurethane, polyurea or poly(urethane-urea), in which component A reacts primarily with component B and not to any substantial extent with either component C or component D, and in which component B reacts primarily with component A rather than with either of components C or D, and in which components C and D each react more readily with each other than with either of components A or B.

8. A process according to claim 7, in which the polyorganosiloxane (A) is a polydiorganosiloxane having hydroxyl end groups.

9. A process according to claim 7, in which the curing agent (B) is an alkoxysilane.

10. A process according to claim 9, in which said alkoxysilane is tetraethyl orthosilicate.

11. A process according to claim 7, in which the polyisocyanate (C) comprises a flexible polymer chain tipped with isocyanate groups and has a molecular weight of 600 to 3000 and the active-hydrogen-providing compound (D) has a molecular weight less than 300.

12. A process according to claim 11, in which the polyisocyanate (C) is an isocyanate-tipped polyether.

13. A process according to claim 11, in which the polyisocyanate (C) is tipped with a cycloaliphatic diisocyanate.

14. A process according to claim 11, in which the active-hydrogen-providing compound (D) is a polyamine or hydroxyamine.

15. A process according to claim 14, in which the compound (D) is an aromatic diamine.

16. A process according to claim 7, in which the polyisocyanate (C) has a molecular weight less than 300 and the active-hydrogen-providing compound (D) is a flexible polymer chain tipped with hydroxyl and/or amine groups and has a molecular weight of 600 to 3000.

17. A process according to claim 7, in which the active-hydrogen-providing compound (D) is an oxazolidine.

18. A process according to claim 17, in which said oxazolidine is a compound containing at least two oxazolidine groups.

19. A process according to claim 17, in which said oxazolidine has the formula:

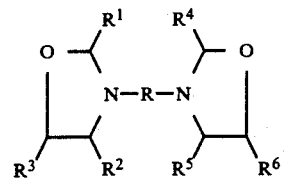

where R is a divalent organic group and $R^1$ to $R^6$ are each independently selected from hydrogen atoms and inert substituents.

20. A process according to claim 17, in which the coating composition comprises a carboxylic acid.

21. A process according to claim 7, in which the weight ratio of the polyorganosiloxane (A) plus curing agent (B) to the polyisocyanate (C) plus active-hydrogen-providing compound (D) in the coating composition is 60:40 to 95:5.

22. A process according to claim 21, in which said weight ratio is 70:30 to 90:10.

23. A process according to claim 7, in which the coating composition also contains a non-reactive fluid polyorganosiloxane.

24. A process according to claim 23, in which said non-reactive fluid polyorganiosiloxane is a methyl phenyl silicone oil.

25. A process according to claim 7, in which said coating composition also contains a non-reactive fluid organic compound selected from the group consisting of lubricating mineral oils, low molecular weight polybutene, petrolatum and liquid paraffin/petrolatum mixtures.

* * * * *